(12) United States Patent
Koester et al.

(10) Patent No.: US 12,117,000 B2
(45) Date of Patent: Oct. 15, 2024

(54) ORBITING SCROLL PLATTER MASS REDUCTION

(71) Applicant: Hanon Systems, Daejeon (KR)

(72) Inventors: Steven Koester, Toledo, OH (US); Rance Stehouwer, Ann Arbor, MI (US); Armando Nelson Pedro da Silva, Corroios (PT); Susana Isabel Nobre Salvador, Azeitão (PT)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/317,333

(22) Filed: May 15, 2023

(65) Prior Publication Data

US 2023/0400023 A1 Dec. 14, 2023

Related U.S. Application Data

(60) Provisional application No. 63/366,087, filed on Jun. 9, 2022.

(51) Int. Cl.
*F04C 18/02* (2006.01)
*B23P 15/00* (2006.01)
*B29C 45/14* (2006.01)
*B29L 31/00* (2006.01)

(52) U.S. Cl.
CPC ...... *F04C 18/0253* (2013.01); *F04C 18/0215* (2013.01); *B23P 15/00* (2013.01);
(Continued)

(58) Field of Classification Search
CPC ............. F04C 18/0253; F04C 18/0215; F04C 2230/10; F04C 2230/60; F04C 2230/91;
(Continued)

(56) References Cited

U.S. PATENT DOCUMENTS

| 4,472,120 A | * | 9/1984 | McCullough | ........... F01C 21/08 |
| | | | | 418/83 |
| 5,127,809 A | * | 7/1992 | Amata | ................ F04C 18/0253 |
| | | | | 418/55.6 |

(Continued)

FOREIGN PATENT DOCUMENTS

| CN | 103362801 A | * 10/2013 |
| JP | 2786319 B2 | 8/1998 |

(Continued)

OTHER PUBLICATIONS

English Machine Translation of KR20210082791A (translated via USPTO Fit Database) (Year: 2021).*

(Continued)

*Primary Examiner* — Bryan M Lettman
*Assistant Examiner* — Paul W Thiede
(74) *Attorney, Agent, or Firm* — Shumaker, Loop & Kendrick, LLP; James D. Miller

(57) ABSTRACT

An orbiting scroll of a scroll compressor includes a platter wall having a first face including a spiral structure projecting therefrom, a second face having a coupling structure configured to couple the orbiting scroll to a drive mechanism of the scroll compressor, and a circumferential surface connecting the first face to the second face in an axial direction of the platter wall. The orbiting scroll includes a mass reduction feature provided as an inwardly indented channel formed in the circumferential surface. The channel is further configured to form a retaining feature for retaining a rim of a mask during a process of coating the spiral structure of the first face with a surface coating.

22 Claims, 8 Drawing Sheets

(52) U.S. Cl.
CPC ....... *B29C 45/14* (2013.01); *B29L 2031/7496* (2013.01); *F04C 2230/10* (2013.01); *F04C 2230/60* (2013.01); *F04C 2230/91* (2013.01); *F04C 2240/20* (2013.01); *Y10T 29/49236* (2015.01); *Y10T 29/4924* (2015.01); *Y10T 29/4987* (2015.01); *Y10T 29/49876* (2015.01); *Y10T 29/49885* (2015.01); *Y10T 29/49888* (2015.01); *Y10T 29/49982* (2015.01); *Y10T 29/49986* (2015.01)

(58) Field of Classification Search
CPC .......... F04C 2240/20; Y10T 29/49236; Y10T 29/4924; Y10T 29/4987; Y10T 29/49876; Y10T 29/49885; Y10T 29/49982; Y10T 29/49986; B23P 15/00; B29C 45/14; B29L 2031/7496
See application file for complete search history.

(56) References Cited

U.S. PATENT DOCUMENTS

| | | | |
|---|---|---|---|
| 5,304,045 A * | 4/1994 | Hoshino | F04C 18/0269 417/372 |
| 8,202,071 B2 | 6/2012 | Kii et al. | |
| 2014/0086775 A1 * | 3/2014 | Park | F04C 18/0215 418/55.1 |
| 2020/0291941 A1 * | 9/2020 | Liu | F04C 18/0253 |
| 2021/0131431 A1 | 5/2021 | Bou Dargham et al. | |

FOREIGN PATENT DOCUMENTS

| | | | |
|---|---|---|---|
| JP | 2003120554 A | | 4/2003 |
| JP | 2009108748 A | * | 5/2009 |
| KR | 10199970002222 B1 | | 2/1997 |
| KR | 20060104444 A | | 10/2006 |
| KR | 20210082791 A | * | 7/2021 |
| WO | WO-2021054241 A1 | * | 3/2021 |

OTHER PUBLICATIONS

English Machine Translation of JP2009108748A (translated via USPTO Fit Database) (Year: 2009).*

English Machine Translation of WO2021054241A1 (translated via USPTO Fit Database) (Year: 2021).*

English Machine Translation of CN103362801A translated by USPTO Fit datebase on Dec. 27, 2023 (Year: 2013).*

* cited by examiner

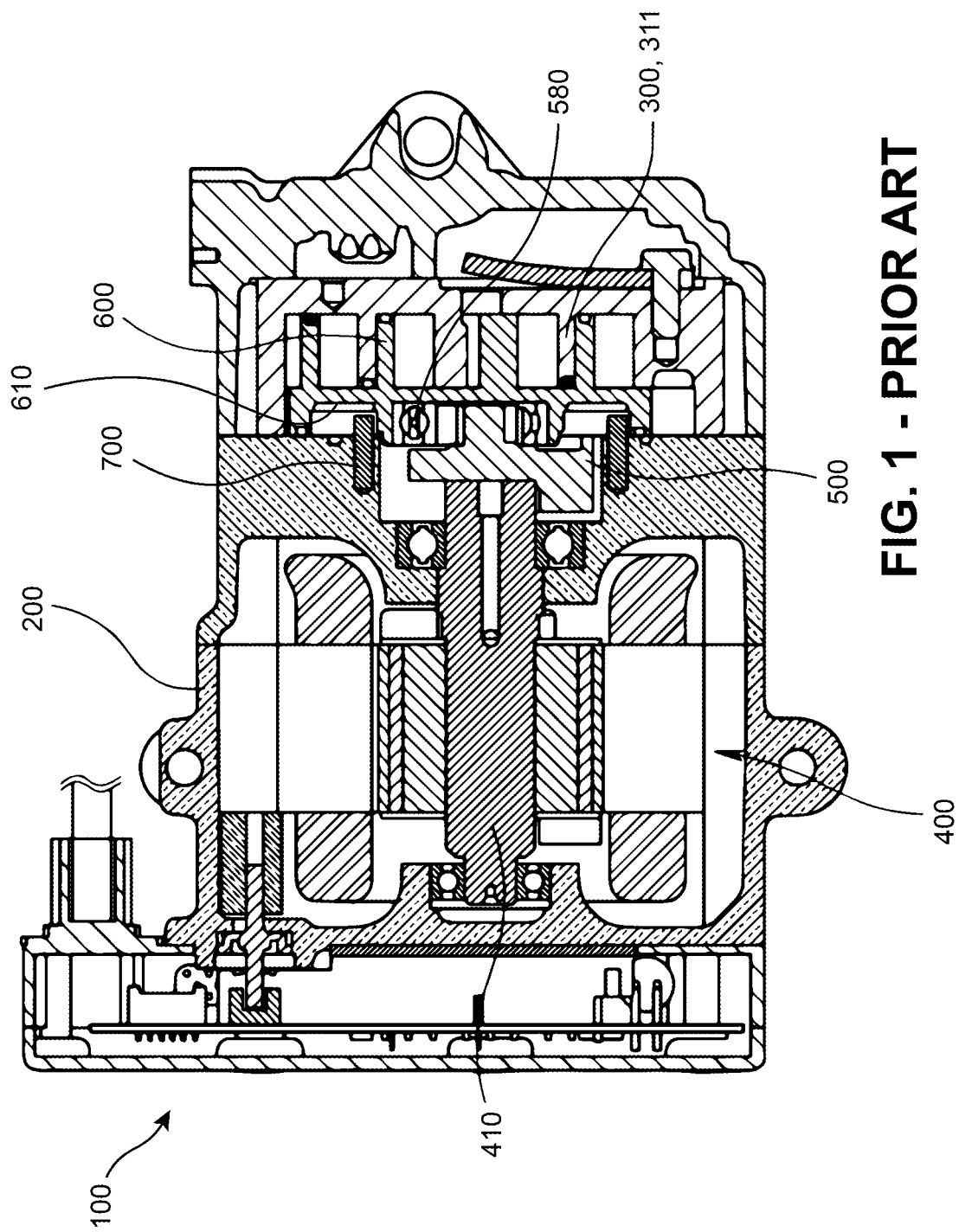
FIG. 1 - PRIOR ART

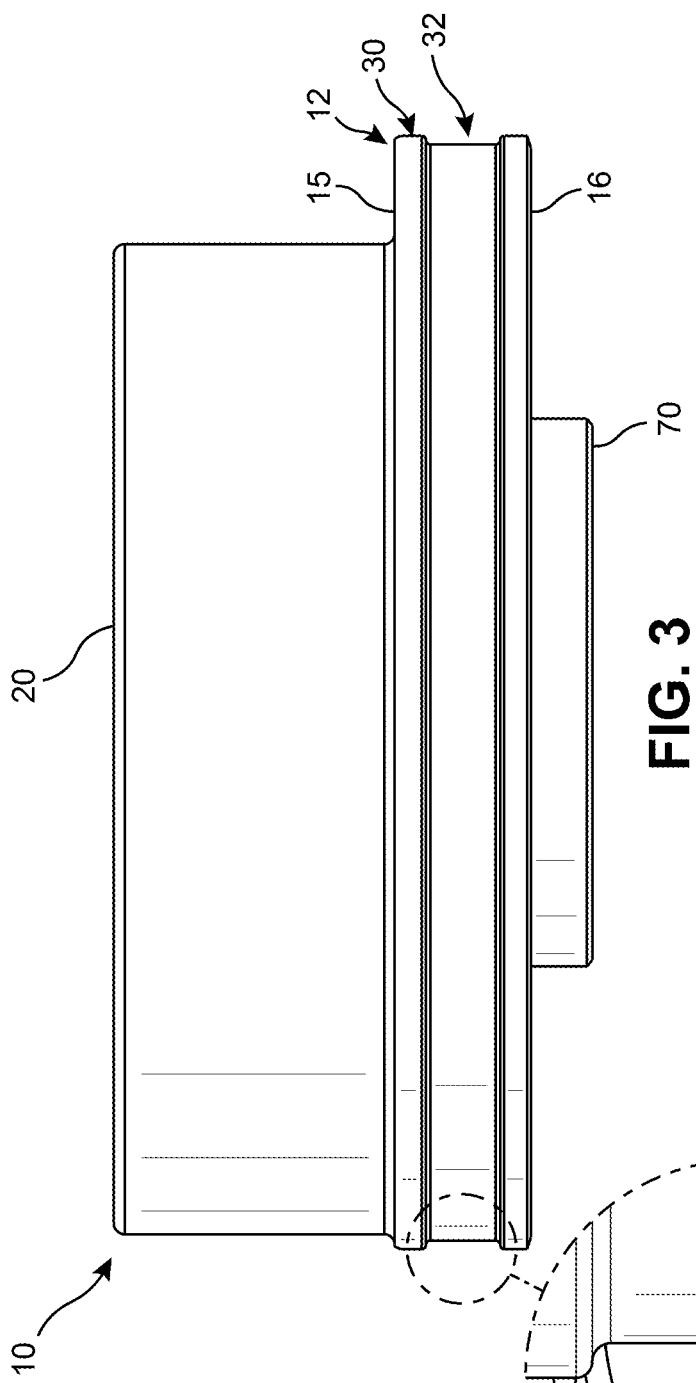
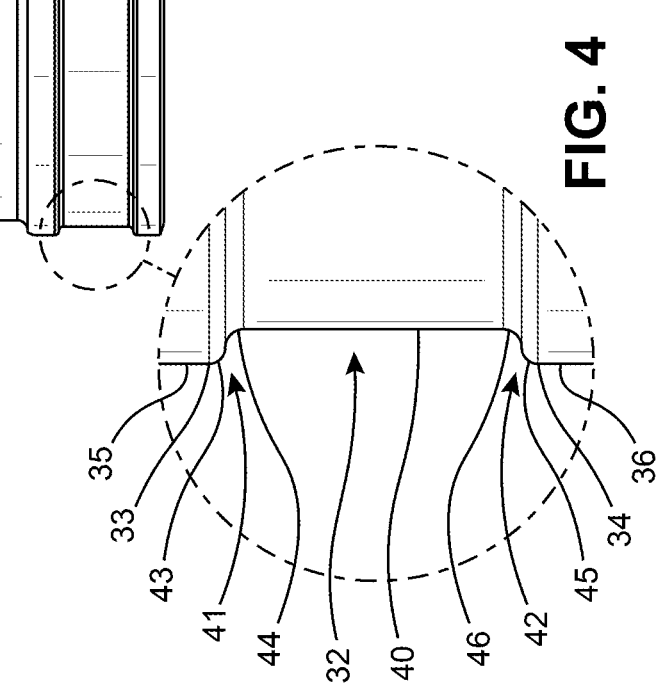

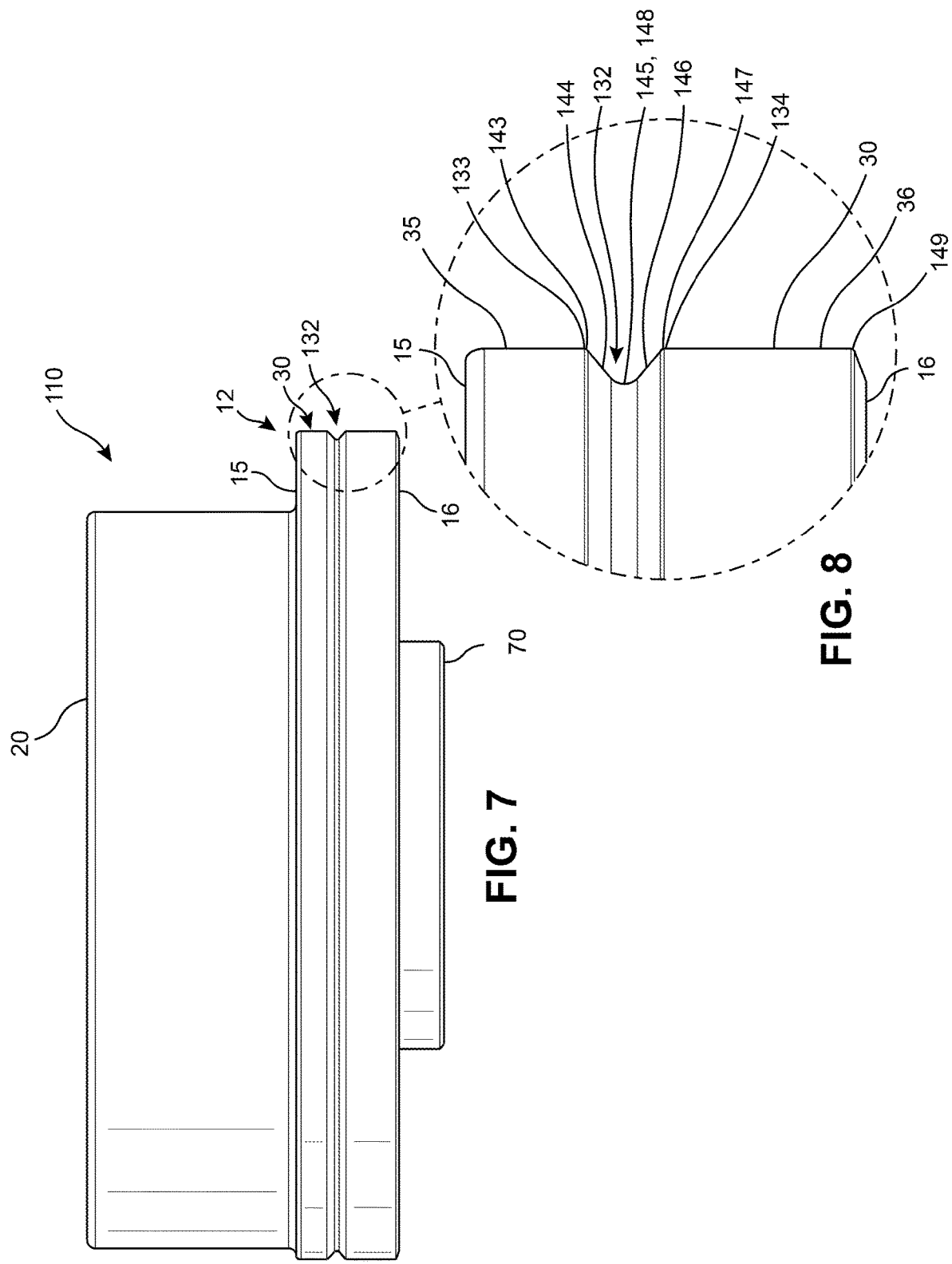

ORBITING SCROLL PLATTER MASS REDUCTION

CROSS-REFERENCE TO RELATED APPLICATION

This patent application claims priority to U.S. Provisional Patent Application Ser. No. 63/366,087, filed on Jun. 9, 2022, the entire disclosure of which is hereby incorporated herein by reference.

FIELD OF THE INVENTION

The invention relates to a scroll compressor, and more particularly, to a scroll compressor having an orbiting scroll with a mass reduction feature incorporated therein.

BACKGROUND

Vehicles are generally equipped with air-conditioning systems for cooling/heating the interior thereof. Such an air-conditioning system includes a compressor, as one of the components of a cooling system, which compresses a low-temperature and low-pressure gas refrigerant introduced from an evaporator to convert it into a high-temperature and high-pressure gas refrigerant, and which transfers the converted gas refrigerant to a condenser. One example of a compressor serving to compress a refrigerant in a vehicle cooling system is a scroll compressor utilizing an orbiting scroll and a fixed scroll.

FIG. 1 illustrates an exemplary scroll compressor 100 according to the prior art. The scroll compressor 100 includes a housing 200, a fixed scroll 300 provided inside the housing 200, a drive motor 400 which drives an orbiting scroll 600, an eccentric bush 500 which is coupled to a rotary shaft 410 of the drive motor 400, and the orbiting scroll 600 which is coupled to the eccentric bush 500 to revolve around the fixed scroll 300 via an intervening bearing 580. At least one compression chamber is formed between the fixed scroll 300 and the orbiting scroll 600 during the relative motion therebetween.

The orbiting scroll 600 is eccentrically coupled to the rotary shaft 410 by the eccentric bush 500 and corresponding bearing 580. The assembly of the eccentric bush 500 and the bearing 580 serves to turn the orbiting scroll 600 using rotary power transferred from the rotary shaft 410. The scroll compressor 100 includes cooperating first and second rotation preventing features for preventing undesired rotation of the orbiting scroll 600 during the orbiting motion thereof. In the illustrated embodiment, the first rotation preventing feature includes a plurality of pin receiving openings 610 formed in a face of the orbiting scroll 600 and the second rotation preventing feature includes a corresponding set of pins 700 extending axially from the housing 200 with each of the pins 700 received within a corresponding one of the pin receiving openings 610. An inner surface of each of the pin receiving openings 610 and an outer surface of each of the pins 700 interact with one another to constrain the orbiting scroll 600 to the desired orbiting motion.

The scroll compressor 100 accordingly includes the power of the drive motor 400 being utilized to result in the orbiting motion of the orbiting scroll 600 via the assembly of the rotary shaft 410, the eccentric bush 500 (and corresponding bearing 580), and the orbiting scroll 600. A mass of the orbiting scroll 600 is accordingly directly related to the amount of power that is utilized by the drive motor 400 in orbiting the orbiting scroll 600 at a desired rate in accordance with the generation of the desired pressures within the scroll compressor 100.

In electric and hybrid electric vehicles, it is common for such a scroll compressor to be powered by the same battery assembly responsible for powering the drive system of the vehicle. A reduction in the mass of the orbiting scroll, which corresponds to a reduction in the power necessary to orbit the orbiting scroll with respect to otherwise similar operating conditions, may accordingly be employed to improve the operating efficiency of the corresponding scroll compressor via a reduction in the power utilized thereby. This reduction in the power necessary to attain the desired operating conditions within the scroll compressor in turn extends the range of the vehicle as powered by the battery assembly thereof during periods of use of the compressor, such as when the air-conditioning system of the vehicle is employed.

It is accordingly desirable to provide an orbiting scroll of a scroll compressor having a minimized mass in order to increase vehicle range and operating efficiency.

The orbiting scroll utilized in such scroll compressors may require the application of wear-resistant surface coatings to the engaging surfaces of a spiral structure of the orbiting scroll to reduce wear where the orbiting scroll spiral structure engages a corresponding spiral structure of an associated fixed scroll. Because it may be desirable to apply such coatings only to the desired engaging surfaces of the spiral structure, it has been proposed to utilize a mask over at least a portion of the orbiting scroll during the application of such surface coatings. For example, FIGS. 2A and 2B illustrate a method of selectively applying such a surface coating only to desired surfaces of a first face 601 of the orbiting scroll 600 having a spiral structure 605 extending axially therefrom. An opposing second face 602 of the orbiting scroll 600 is covered by a mask 620 to prevent the surface coating from reaching certain surfaces of the orbiting scroll 600, such as the surfaces thereof corresponding to a rotation prevention feature, or the surfaces thereof engaging the bearing 580 associated with the eccentric bush 500. The mask 620 may include projections or indentations formed in a face thereof that are complimentary to engaging surfaces of the second face 602 of the orbiting scroll 600 to locate the mask 620 relative to the second face 602. The process of applying the coating may further include the use of a guide structure 625 configured to axially engage the periphery of the mask 620 during the coating application to further affix a position of the mask 620 relative to the orbiting scroll 600. The use of the guide structure 625 also ensures that the application of the surface coating does not leak towards the masked surfaces of the orbiting scroll 600 via the application of an axial force at the periphery of the mask 620, which may be formed from a relative soft and elastomeric material such as silicone.

The process of applying the surface coating according to FIGS. 2A and 2B may accordingly require the need to perform each of locating the mask 620 to cooperate with the engaging features of the second face 602 of the orbiting scroll 600, positioning the located mask 620 relative to the associated guide structure 625, and to then axially translating the guide structure 625 to compressively engage the mask 620 adjacent the periphery thereof, in order to securely apply the surface coating without intruding upon the masked surfaces of the orbiting scroll 600. The described process undesirably requires dedicated equipment and multiple set-up steps that add cost and inefficiency to the described process of applying the surface coating.

It is accordingly also desirable to provide a more efficient and cost effective method of selectively applying a surface coating to an orbiting scroll of a scroll compressor in addition to reducing a mass of the orbiting scroll.

SUMMARY OF THE INVENTION

Consistent and consonant with an embodiment of the present invention, an improved mass reduction structure and method of manufacturing an orbiting scroll of a scroll compressor is surprisingly discovered.

According to an embodiment of the present disclosure, an orbiting scroll of a scroll compressor includes a platter wall having a first face including a spiral structure projecting therefrom, a second face having a coupling structure configured to couple the orbiting scroll to a drive mechanism of the scroll compressor, and a circumferential surface connecting the first face to the second face in an axial direction of the platter wall. The orbiting scroll includes a mass reduction feature provided as an inwardly indented channel formed in the circumferential surface. The channel is further configured to form a retaining feature for retaining a rim of a mask during a process of coating the spiral structure of the first face with a surface coating.

A method of manufacturing an orbiting scroll is also disclosed herein. The method comprises the steps of: forming a platter wall having a first face including a spiral structure projecting therefrom, a second face having a coupling structure configured to couple the orbiting scroll to a drive mechanism of the scroll compressor, and a circumferential surface connecting the first face to the second face in an axial direction of the platter wall about a periphery of each of the first face and the second face; and removing material from the platter wall along the circumferential surface thereof following the forming of the platter wall to reduce a mass thereof, the removing of the material from the circumferential surface forming an inwardly indented channel therein.

BRIEF DESCRIPTION OF THE DRAWINGS

Further details, features and advantages of configurations of the invention emerge from the following description of exemplary embodiments with reference to the associated figures:

FIG. 1 is an elevational cross-sectional view of a conventional scroll compressor according to the prior art;

FIG. 3 is a side elevational view of an orbiting scroll having a mass reduction feature according to an embodiment of the present invention;

FIG. 4 is an enlarged side elevational view of the encircled portion of the orbiting scroll as shown in FIG. 3;

FIG. 7 is a side elevational view of an orbiting scroll having a mass reduction feature according to another embodiment of the present invention;

FIG. 8 is an enlarged side elevational view of the encircled portion of the orbiting scroll as shown in FIG. 7;

DETAILED DESCRIPTION OF THE DISCLOSURE

Figure 2A:
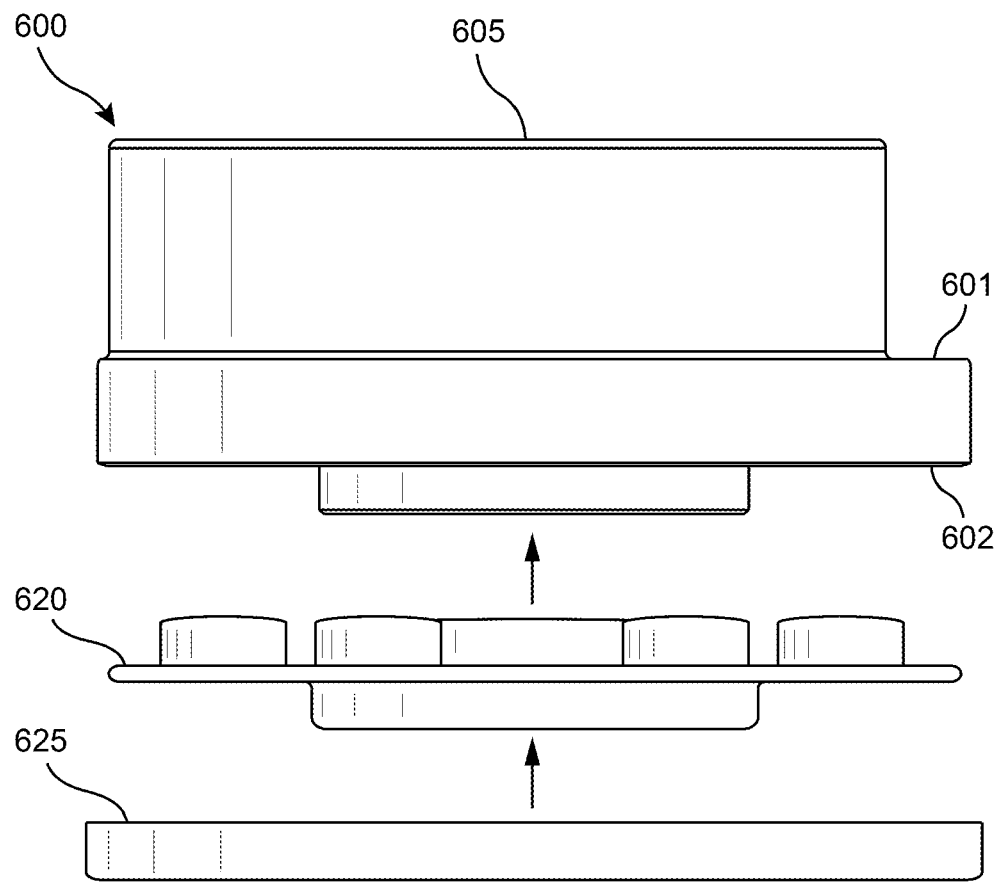
FIG. 2A is an exploded side elevational view of a mask and guide structure assembly utilized in applying a surface coating to select surfaces of an orbiting scroll, wherein the mask and guide structure are shown prior to engagement with the orbiting scroll.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8,1-3,1-2,2-10, 2-8,2-3,3-10,3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure relates to an orbiting scroll 10 of a scroll compressor according to an embodiment of the present invention. The orbiting scroll 10 includes a mass reduction feature formed therein for reducing the power required to cause an orbiting of the orbiting scroll 10 within a corresponding scroll compressor. The orbiting scroll 10 as disclosed herein may be configured for use in substantially any suitable scroll compressor utilizing an orbiting scroll configured to orbit relative to a cooperating fixed scroll while remaining within the scope of the present invention. The orbiting scroll 10 as shown and described herein may be suitable for use with a scroll compressor such as the scroll compressor 100 of the prior art disclosed in FIG. 1 of the present disclosure, wherein the orbiting scroll 10 having the mass reduction feature provided therein is substituted for the orbiting scroll 600 of FIG. 1 while operating in substantially the same manner with respect to the mechanisms and interactions causing the orbiting scroll 10 to have a prescribed orbiting motion relative to a corresponding fixed scroll, such as the depicted fixed scroll 300. The orbiting scroll 10 may be described hereinafter relative to the scroll compressor 100 in order to provide additional context to the manner of operation of the orbiting scroll 10 relative to adjacent and interacting components of a corresponding scroll compressor.

The orbiting scroll 10 includes a plate-like portion that may be referred to as the platter 12 or platter wall 12 of the orbiting scroll 10. The platter 12 includes a first face 15, a second face 16, and a circumferential surface 30. The first face 15 refers to a first axial end surface of the platter 12 and the second face 16 refers to a second axial end surface of the platter 12 disposed opposite the first face 15 thereof. The circumferential surface 30 connects the first face 15 to the second face 16 about a periphery of each of the opposing faces 15, 16. The circumferential surface 30 extends in an axial direction of the orbiting scroll 10 as the circumferential surface 30 extends between the first face 15 and the second face 16.

The circumferential surface 30 may have a circular profile shape to result in the circumferential surface 30 having a cylindrical shape. However, the circumferential surface 30 is not necessarily limited to an axially symmetric shape such as the described cylindrical surface having circular shaped features, but may include substantially any peripheral shape corresponding to the peripheral shape of the corresponding first and second faces 15, 16 to which the circumferential surface 30 connects. For example, the first face 15 and the second face 16 may each have irregular and non-axially symmetric peripheral shapes that match each other and that are axially aligned with one another such that the circumferential surface 30 extends in the axial direction of the orbiting scroll 10 when connecting the opposing faces 15, 16 about the peripheries thereof.

The first face 15 is provided with an orbiting spiral structure 20 projecting axially therefrom. The orbiting spiral structure 20 is configured to cooperate with a fixed spiral structure of a corresponding scroll compressor for forming at least one compression chamber therebetween during an orbiting of the orbiting scroll 10. For example, the orbiting spiral structure 20 may project axially from the first face 15 for engagement with a fixed spiral structure 311 of the fixed scroll 300 of FIG. 1 when the orbiting scroll 10 is substituted for the illustrated orbiting scroll 600. The orbiting spiral structure 20 may project axially from a planar surface of the first face 15 extending to the periphery thereof. The planar surface of the first face may surround at least a portion of the orbiting spiral structure 20 to cause the circumferential surface 30 to intersect the first face 15 along portions of the planar surface disposed (radially) outwardly of the orbiting spiral structure 20 with respect to a central axis of the orbiting scroll 10.

Figure 5:
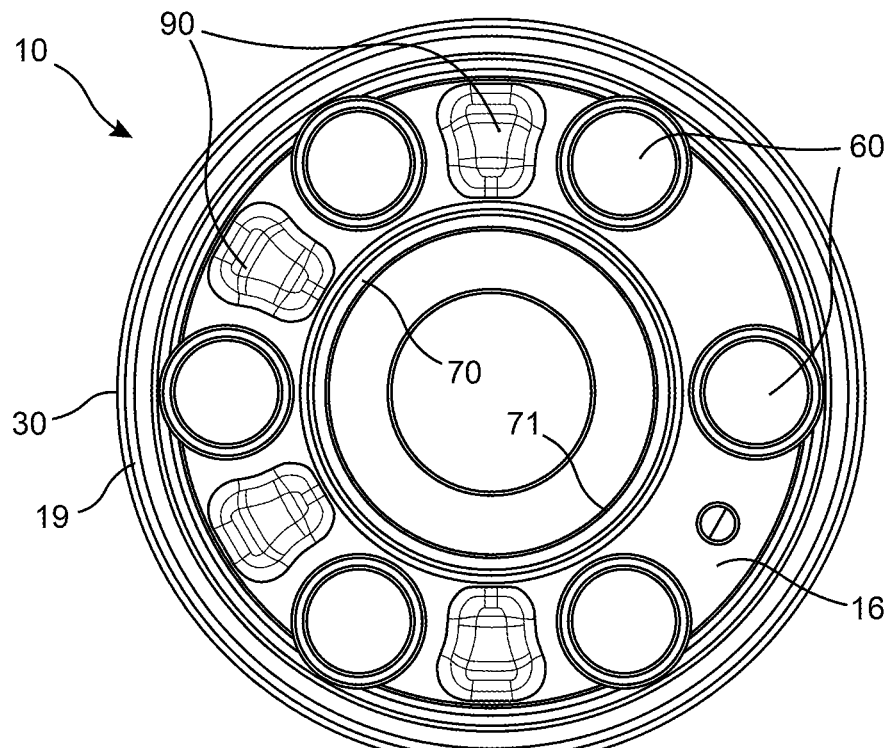
FIG. 5 is a front view of the orbiting scroll of FIG. 3 showing a face of the orbiting scroll configured to engage a drive mechanism of a corresponding scroll compressor.

The second face 16 may include at least one rotation prevention structure 60 formed therein (FIGS. 5 and 6) for preventing undesired rotation of the orbiting scroll 10 when orbiting relative to the corresponding fixed scroll. In the illustrated embodiment, the at least one rotation prevention structure 60 is provided as a plurality of axially extending and cylindrically shaped indentations 60 formed in the second face 16 adjacent and about the periphery thereof. The plurality of the indentations 60 is shown as including six of the indentations 60 spaced apart from each other by equal 60° angular displacements relative to the central axis of the cylindrical shape of the illustrated platter 12. Each of the indentations 60 may be formed to further receive an annular ring (not shown) or the like that is configured to directly engage a corresponding second rotation prevention structure provided as a feature of the scroll compressor having the orbiting scroll 10, or each of the indentations 60 may be configured to directly engage such a second rotation prevention structure of the scroll compressor. Each of the illustrated indentations 60 (or rings received therein) may be suitable for reception of a cylindrical pin or projection having a configuration such as that disclosed with reference to the pins 700 projecting axially from the housing 200 of the scroll compressor 100 of FIG. 1. The formation of the rotation prevention structures 60 as voids in the form of cylindrical indentations 60 may be beneficial as a means to reduce a mass of the orbiting scroll 10.

However, it should be readily apparent to one skilled in the art that the configuration of the rotation prevention structures 60 may be modified from that disclosed while still remaining within the scope of the present invention, so long as the cooperating structures formed between the orbiting scroll 10 and the corresponding features of the receiving scroll compressor are configured to cooperate with each other for causing the desired orbiting motion in the absence of rotation of the orbiting scroll 10, while also not interfering with the disclosed and novel configuration of the circumferential surface 30 of the orbiting scroll 10, as described in greater detail hereinafter.

The second face 16 also includes a drive engaging structure 70 (best shown in FIGS. 5 and 6) configured to mechanically couple the orbiting scroll 10 to a drive mechanism of the corresponding scroll compressor for prescribing the orbiting motion of the orbiting scroll 10. The drive engaging structure 70 is shown as a cylindrical collar projecting axially from the second face 16 with the collar defining a cylindrical inner circumferential surface 71 arranged concentrically relative to the central axis of the orbiting scroll 10. The inner circumferential surface 71 may be configured to engage a bearing configured to provide relative rotational motion between the inner circumferential surface 71 and an outer circumferential surface of a corresponding eccentric bush. For example, the inner circumferential surface 71 may be configured to receive the bearing 580 of FIG. 1 therein for transferring the rotational motion of the drive shaft 410 via the eccentric bush 500. However, substantially any structure configured for mechanically coupling the orbiting scroll 10 to a corresponding drive mechanism in a rotatable and orbital manner may be utilized on the second face 16 of the platter 12 while remaining within the scope of the present invention.

The second face 16 may include an axially and circumferentially extending rim 19 about the periphery thereof. The rim 19 may define a surface arranged perpendicular to the axial direction of the orbiting scroll 10 with the perpendicular arranged surface intersecting the circumferential surface 30 about the periphery thereof. However, the second face 16 may be provided in the absence of the axially extending rim 19, and may alternatively be provided to include substantially any configuration of the perpendicular arranged surface of the second face 16 that extends to and intersects the circumferential surface 30.

The circumferential surface 30 of the platter 12 includes a first mass reduction feature in the form of a circumferentially extending and radially inwardly extending channel 32 formed within the circumferential surface 30 intermediate the first face 15 and the second face 16 thereof. Specifically, the channel 32 may be provided to extend axially from a first axial end 33 thereof disposed towards and adjacent the first face 15 to an opposing second axial end 34 disposed towards and adjacent the second face 16, wherein the first axial end 33 is axially spaced apart from the first face 15 by a first axially extending surface 35 of the circumferential surface 30 and the second axial end 34 is axially spaced apart from the second face 16 by a second axially extending surface 36 of the circumferential surface 30. The circumferential surface 30 is accordingly divisible axially, when progressing in the axial direction from the first face 15 to the second face 16, into the first axially extending surface 35, the channel 32, and then the second axially extending surface 36. The first axially extending surface 35 and the second axially extending surface 36 may be axially aligned with one another at the opposing axial ends 33, 34 of the channel 32 and may be cylindrical surfaces extending exclusively in the axial direction of the orbiting scroll 10, as desired.

The channel 32 includes a centrally disposed axially extending segment 40, a first transition segment 41 at the first axial end 33 of the channel 32, and a second transition segment 42 at the second axial end 34 of the channel 32. Each of the features 40, 41, 42 of the channel 32 described herein may be extended circumferentially about an entirety of the circumferential surface 30 or about a portion of a circumference thereof, as desired, so long as a desired mass distribution is maintained within the orbiting scroll 10. Each of the transition segments 41, 42 is provided as a radiused and inwardly extending portion of the circumferential surface 30 for preventing the formation of an undesirably sharp edge along the circumferential surface 30. Specifically, each of the transition segments 41, 42 includes a respective pair of radiused surfaces allowing for a smooth transition from the axially extending segment 40 of the channel 32 to each of the radially spaced apart and axially straddling first and second axially extending surfaces 35, 36 of the circumferential surface 30 disposed outside of and at each axial end 33, 34 of the channel 32.

The first transition segment 41 includes a first convex surface 43 extending from the first axially extending surface 35 at the first axial end 33 of the channel 32. Specifically, the convexity of the first convex surface 43 includes the first convex surface 43 curving arcuately (radially) inwardly from a first end of the first convex surface 43 arranged parallel to and intersecting the first axially extending surface 35 to a second end of the first convex surface 43 intersecting a first end of a first concave surface 44 of the first transition segment 41, wherein the second end of the first convex surface 43 is not arranged parallel to the axial direction of the orbiting scroll 10, but is instead arranged at an incline thereto. The concavity of the first concave surface 44 includes the first concave surface 44 continuing to curve arcuately (radially) inwardly from the first end of the first concave surface 44 arranged parallel to and intersecting the (inclined) second end of the first convex surface 43 to a second end of the first concave surface 44 arranged parallel to and intersecting the centrally disposed axially extending segment 40.

The second transition segment 42 includes a second convex surface 45 extending from the second axially extending surface 36 at the second axial end 34 of the channel 32. Specifically, the convexity of the second convex surface 45 includes the second convex surface 45 curving arcuately (radially) inwardly from a first end of the second convex surface 45 arranged parallel to and intersecting the second axially extending surface 36 to a second end of the second convex surface 45 intersecting a first end of a second concave surface 46 of the second transition segment 42, wherein the second end of the second convex surface 45 is not arranged parallel to the axial direction of the orbiting scroll 10, but is instead arranged at an incline thereto. The concavity of the second concave surface 46 includes the second concave surface 46 continuing to curve arcuately (radially) inwardly from the first end of the second concave surface 46 arranged parallel to and intersecting the (inclined) second end of the second convex surface 45 to a second end of the second concave surface 46 arranged parallel to and intersecting the centrally disposed axially extending segment 40.

The illustrated embodiment includes each of the concave and convex surfaces 43, 44, 45, 46 having the same radius of curvature, which may be described as being equal to either half of the radial distance present between the axially extending surfaces 35, 36 exterior to the channel 32 and the axially extending segment 40 thereof, or equal to the axial distance present between the axially extending segment 40 of the channel 32 and either of the adjoining axially extending surfaces 35, 36 of the circumferential surface 30. This relationship results in each of the convex and concave surfaces 43, 44, 45, 46 having a shape of a 90° segment of a circular arc with the intersection between each pairing of convex and concave surfaces 43, 44, 45, 46 occurring in a direction perpendicular to the axial direction of the orbiting scroll 10, which may be referred to as the radial direction of the orbiting scroll 10.

However, it should be apparent that alternative curvatures and configurations may be utilized while maintaining a smooth and edgeless transition at each of the ends 33, 34 of the channel 32 for accommodating the radial steps formed in the circumferential surface 30. For example, each of the concave and convex surfaces 43, 44, 45, 46 may include curvature through less than a 90° arc to result in the intersection therebetween being at a non-perpendicular incline relative to the axial direction of the orbiting scroll 10. The channel 32 may also be formed to include a configuration devoid of the described axially extending segment 40. Instead, the second ends of the first and second concave surfaces 43, 45 may meet each other directly where such surfaces are arranged in parallel to the axial direction of the orbiting scroll 10, as desired, so long as the resulting shape includes a smooth and edgeless profile shape. As yet another example, a radial inward depth of the channel 32 may be increased by introducing an intermediate inclined or radially extending surface (not shown) between the described second end of each of the convex surfaces 43, 45 and the first end of each of the corresponding concave surfaces 44, 46. With respect to the 90° arcs of the convex and concave surfaces 43, 44, 45, 46 shown in FIG. 4, such an intermediate segment may be arranged perpendicular to the axial direction of the orbiting scroll 10 (corresponding to a 90° incline and an exclusively radially extending surface) to result in each of the convex surfaces 43, 45 being spaced apart radially a corresponding distance from the corresponding one of the concave surfaces 44, 46 for increasing a depth of the channel 32 in the radial direction. If an incline of greater than 0° and less than 90° is utilized, then each of the intermediate segments may space each of the concave surfaces 44, 46 radially inwardly and axially inwardly from the corresponding one of the convex surfaces 43, 45, and may include a substantially frustoconical shape therebetween. Such intermediate segments would be arranged at an incline parallel to each of the intersecting ends of the straddling convex and concave surface 43, 44, 45, 46 to once again result in the elimination of undesired edges or sharp features along the channel 32. A shape of the channel 32 is selected to never increase in axial thickness as the channel 32 progresses radially inwardly to ensure an ease of producing the edgeless indented configuration of the channel 32.

The formation of the channel 32 in the circumferential surface 30 results in a mass reduction of the orbiting scroll 10 at a position that does not negatively affect the structural integrity thereof. The channel 32 is indented radially inwardly at an equal distance relative to each of the axially straddling first and second axially extending segments 35, 36 of the circumferential surface 30 to reduce the radial/diametric dimension of the platter 12 along the channel 32 relative to each of the adjacent axially extending segments 35, 36. The formation of the channel 32 also results in the circumferential surface 30 having a configuration that can be said to include a first annular bead (corresponding to the axially extending segment 35) and a second annular bead (corresponding to the axially extending segment 36), each of which projects radially outwardly relative to the channel 32 formed therebetween, wherein the first annular bead and the second annular bead include a common radius (diameter) that is greater than a radius (diameter) of the channel 32.

The channel 32 may be formed in the circumferential surface 30 during a manufacturing step performed on a previously formed cylindrical platter wall 12 of the orbiting scroll 10. Favorable results have been found wherein the material is removed from the circumferential surface 30 in a final manufacturing step. However, the material can be removed from the circumferential surface 30 at any time during manufacturing, as desired. Any conventional manufacturing step can be used to form the channel 32, as desired, such as cutting, turning, drilling, boring, forging, machining, and other manufacturing steps, for example.

In addition to the mass reduction feature in the form of the channel 32 removed from the platter 12, the orbiting scroll 10 may include a secondary mass reduction feature in the form of at least one mass reduction pocket 90 formed in the second face 16 of the platter 12. In the illustrated embodiment, each of the mass reduction pockets 90 is formed as an axially inwardly indented portion of the second face 16 where an axial thickness of the platter 12 is reduced. Each of the mass reduction pockets 90 is configured to not engage another component of the scroll compressor during operation thereof, thereby distinguishing the mass reduction pockets 90 from a feature such as the indentations 60 configured to aid in preventing rotation of the orbiting scroll during operation of the scroll compressor.

The mass reduction pockets 90 are illustrated as forming an annular array with the individual mass reduction pockets 90 disposed between adjacent ones of the indentations 60. Each of the mass reduction pockets 90 may be provided with a substantially saddle-shaped configuration including a perimeter of each of the mass reduction pockets 90 including inwardly extending and oppositely arranged concave segments having a shape corresponding to the convex circular shape of adjacent ones of the indentations 60 to provide a consistent thickness of the axially extending walls separating the indentations 60 from the mass reduction pockets 90 along the second face 16, thereby maintaining desired mechanical strength of the orbiting scroll 10. Any conventional manufacturing step can be used, as desired, in forming the mass reduction pockets 90, such as cutting, drilling, boring, forging, machining, and other manufacturing steps, for example. A radius, a bevel, or a chamfer may be formed leading into and/or out of each of the mass reduction pockets 90, thereby reducing the likelihood of having sharp edges which may damage portions of the corresponding scroll compressor. It is also understood that the pockets 90 can be formed in other locations of the orbiting scroll 10, as desired, without departing from the scope and spirit of the invention.

The formation of the channel 32 and/or the mass reduction pockets 90 in the orbiting scroll reduces the mass of the orbiting scroll 10 in a manner promoting an improvement in a range and a performance of a vehicle utilizing the orbiting scroll 10 in a corresponding scroll compressor thereof. Specifically, the decrease in the mass of the orbiting scroll 10 corresponds to a required torque necessary to orbit the orbiting scroll similarly being decreased, which decreases the power required to orbit the orbiting scroll 10 for a given set of operating conditions.

Figure 6:
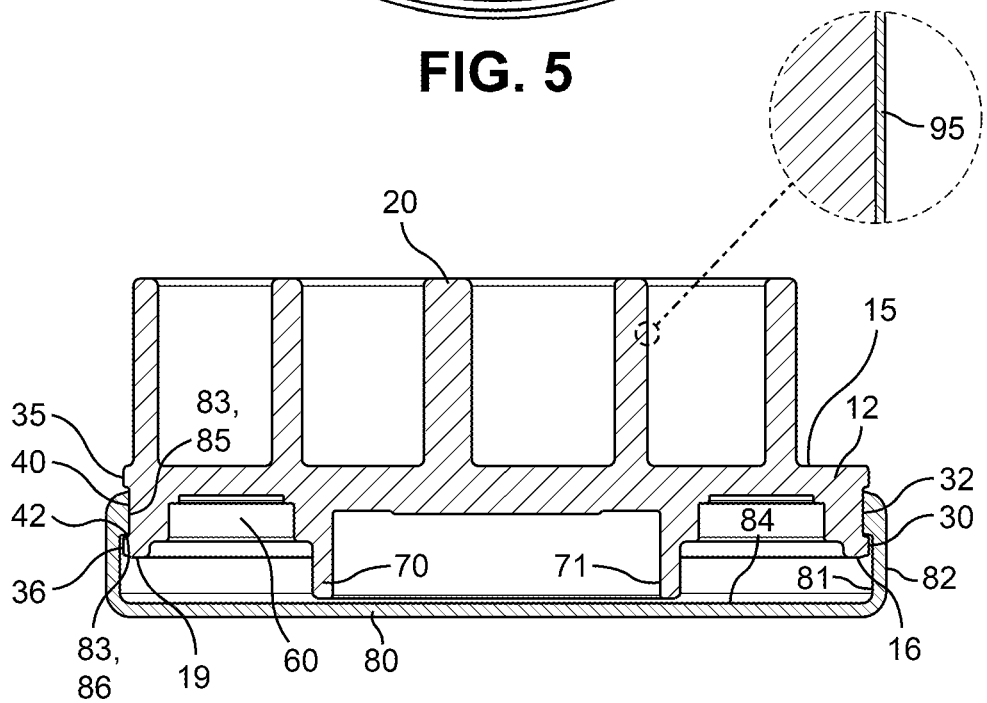
FIG. 6 is an elevational cross-sectional view taken through a center plane of an orbiting scroll having a mask applied thereto according to a method of the present invention, wherein an encircled portion of the orbiting scroll is shown in enlarged format to illustrate a surface coating applied to a surface of the orbiting scroll following application of the mask.

Referring now to FIG. 6, the orbiting scroll 10 having the channel 32 formed in the circumferential surface 30 thereof provides another advantage in that the orbiting scroll 10 may be selectively coated with a desired surface coating 95 according to a simple and efficient process. The surface coating 95 may refer to a wear resistant coating applied to surfaces of the orbiting spiral structure 20 that are configured to engage corresponding surfaces of a fixed spiral structure such as the fixed spiral structure 311 of FIG. 1. The wear resistant coating 95 may be a metallic material, such as nickel, and may be applied via a nickel bath, among other possible coating processes. The orbiting scroll 10 facilitates the simple and efficient process via the manner in which a mask may be more easily retained to the orbiting scroll 10 during the coating process, wherein this improved retention occurs as a result of the configuration of the channel 32 formed in the circumferential surface 30. This process can also occur in the absence of an additional component for affixing the position of the mask 80 relative to the orbiting scroll 10, such as the guide structure 625 of the alternative process proposed in FIGS. 2A and 2B with respect to the exemplary orbiting scroll 600 devoid of the channel 32 therein.

Specifically, the mask 80 is divisible into an inner surface 81 and an outer surface 82, wherein the inner surface 81 refers to any surface of the mask 80 defining an opening into which at least a portion of the orbiting scroll 10 is disposed or inserted during a corresponding coating process, and the outer surface 82 refers to a remainder of an exposed surface of the mask 80 that faces outwardly while not defining the described opening. The inner surface 81 may be further divisible into at least one engaging segment 83 and at least one spaced segment 84, wherein each of the engaging segments 83 refers to a segment of the inner surface 81 directly engaging the exposed outer surface of the orbiting scroll 10 and each of the spaced segments 84 refers to a segment of the inner surface 81 spaced apart from the exposed outer surface of the orbiting scroll 10 in a manner defining a void between each spaced segment 84 and the exposed outer surface of the orbiting scroll 10.

In the present embodiment, the inner surface 81 of the mask 80 includes at least a first engaging segment 85 configured to engage a surface defining the channel 32 that is extending at least partially, if not entirely, in the axial direction of the orbiting scroll 10, such as engaging the axially extending segment 40 of the channel 32. The first engaging segment 85 is also configured to extend at least partially, if not entirely, in the axial direction of the orbiting scroll 10 when engaged with the axially extending surface of the channel 32, such as the axially extending segment 40, to match the shape thereof. The first engaging segment 85 is shown in FIG. 6 as including a cylindrical shape extending around a periphery of an inlet into the opening defined by the inner surface 81 of the mask 80. The first engaging segment 85 may be described as a rim of the mask 80 forming a mouth or inlet into the opening thereof.

The engagement of the first engaging segment 85 with the axially extending surface (segment 40) of the channel 32 results in a configuration wherein an external force attempting to remove the mask 80 from the orbiting scroll 10 via an axial movement of the first engaging segment 85 towards the second face 16 of the orbiting scroll 10 results in the eventual interference between the mask 80 and a feature of the circumferential surface 30. Specifically, a segment of the inner surface 81 of the mask 80 extending at least partially, if not entirely, in the radial direction of the orbiting scroll 10 may eventually engage a segment of the channel 32 that also extends at least partially, if not entirely, in the radial direction of the orbiting scroll 10. The radially extending segment of the surface defining the channel 32 may refer to either of the convex or concave surfaces 45, 46 of the second transition segment 42, or a radially extending surface connecting the convex and concave surfaces 45, 46 when a radial depth of the channel 32 is increased from that shown in FIGS. 3, 4, and 6. The radially extending segment of the inner surface 81 of the mask 80 may form a segment of the inner surface 81 intersecting the first engaging segment 85 at the outer surface of the orbiting scroll 10.

The inner surface 81 of the mask 80 may further include a second engaging segment 86 configured to normally engage a surface defining the channel 32 that is extending at least partially, if not entirely, in the radial direction of the orbiting scroll 10, such as either of the convex or concave surfaces 45, 46 of the second transition segment 42, or a radially extending surface connecting the convex and concave surfaces 45, 46 when a radial depth of the channel 32 is increased from that shown in FIGS. 3, 4, and 6. The second engaging segment 86 may accordingly correspond to the segment of the inner surface 81 providing the interference with the channel 32 of the orbiting scroll 10 as described above, but such interference may be provided immediately upon a force being applied to the mask 80 tending to cause a removal thereof from over the orbiting scroll 10, as opposed to occurring following axial movement of the first engaging segment 85. In some circumstances, the second engaging segment 86 may directly intersect the first engaging segment 85 at the outer surface of the orbiting scroll 10.

The mask 80 of FIG. 6 is retained within the channel 32 due to the first engaging segment 85 of the inner surface 81, which forms an inlet into the opening formed by the inner surface 81, having an inner radius (diameter) that is smaller than that of the second annular bead 36 formed by the second axially extending segment 36 of the circumferential surface 30, which is disposed axially between the first engaging segment 85 and the second face 16 of the orbiting scroll 10. Any surfaces of the orbiting scroll 10 engaged with the first engaging segment 85 as well as any surfaces of the orbiting scroll 10 disposed axially beyond the first engaging segment 85 and within the opening formed by the inner surface 81 may accordingly be covered by the mask 80 during a corresponding coating process, such as subjecting the assembly of the mask 80 and the orbiting scroll 10 to a corresponding nickel bath.

The mask 80 as shown and described may be formed from an elastomeric material, such as silicone, as one non-limiting example. The elastomeric material may be selected to include an elasticity suitable for causing the first engaging segment 85 to apply a desired compressive force to the circumferential surface 30 for creating a fluid tight seal that can prevent the flow of a coating material between the first engaging segment 85 and the circumferential surface 30 of the orbiting scroll 10. An attempt to remove the mask 80 from over the orbiting scroll 10 includes the need to widen the cylindrical mouth formed by the first engaging segment 85 to fit over the enlarged second axially extending segment/second annular bead 36, wherein such a radial outward widening of the mouth results in an increased elastic force compressing the first engaging segment 85 radially inwardly towards the circumferential surface 30. The elasticity of the material forming the mask 80 may accordingly be utilized in preventing undesired removal of the mask 80 from the orbiting scroll 10 while also promoting the generation of a fluid tight seal where the elastomeric material directly engages the circumferential surface 30 in a radially inward and compressive manner.

In some embodiments, the mask 80 may be manufactured independently of the orbiting scroll 10 to normally (when not stretched) include the inlet or mouth thereof as defined by the first engaging segment 85 having an inner radius (diameter) that is less than an outer diameter of the channel 32 along the radially innermost surface thereof, such as the illustrated axially extending segment 40 of the channel 32. This configuration ensures that the mask 80 always applies a radially inward compressive force to the circumferential surface 30 once the first engaging segment 85 has been received in the channel 32, which occurs following a radial outward stretching of the first engaging segment 85 over the second axially extending segment 36 of the circumferential surface 30.

In other embodiments, the mask 80 may be molded directly onto the outer surface of the orbiting scroll 10 to include the configuration described herein. Specifically, the molding of the mask 80 over the orbiting scroll 10 may include the elastomeric material flowing to a position contacting the outer surface of the orbiting scroll 10 along each of the resulting engaging segments 83 of the inner surface 81, the use of one or more mold components (not shown) defining the spaced segments 84 of the inner surface 81 of the mask 80, and the use of one or more mold components defining the outer surface 82 of the mask 80. The molding process may include the elastomeric material flowing to form at least the first engaging segment 85 and/or the second engaging segment 86 along the circumferential surface 30. The direct molding process results in the formation of a fluid tight seal where the elastomeric material directly engages the outer surface of the orbiting scroll 10. The molded mask 80 also elastically resists removal from over the second annular bead 36 in the manner described above.

Figure 2B:
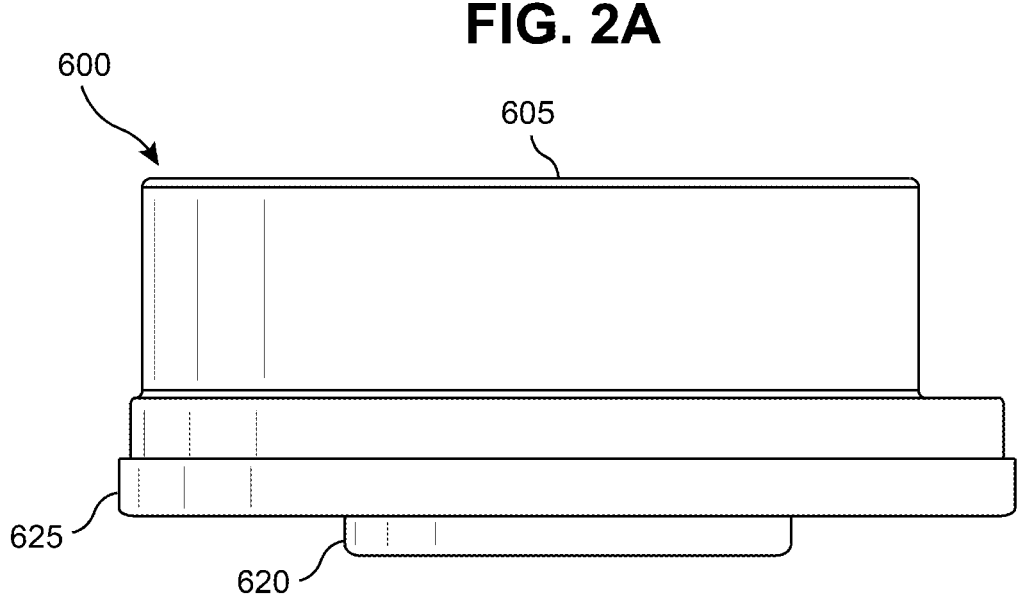
FIG. 2B is a side elevational view showing the mask and guide structure assembly when engaging a masked face of the orbiting scroll of FIG. 2A during a process of applying the surface coating.

The use of the channel 32 as a retaining feature of the orbiting scroll 10 provides numerous opportunities to beneficially simplify the process utilized in positioning the mask 80 relative to the orbiting scroll 10 in comparison to the guided process disclosed in FIGS. 2A and 2B, wherein the guided process relies upon a specific positioning and locating of multiple components and/or structural features to result in the desired configuration of a mask relative to an orbiting scroll. For example, the manner in which the first engaging segment 85 retains the mask 80 to the orbiting scroll 10 at a position along the circumferential surface 30 results in the ability to form the mask 80 absent a specific configuration suitable for mating with the configuration of the various surface features 60, 70, 90 formed in the second face 16 of the orbiting scroll 10. Instead, the inner surface 81 of the mask 80 can be formed to include the spaced segments 84 that do not necessarily conform to any specific mating surface of the orbiting scroll 10, thereby allowing for increased flexibility in placing the mask 80 over the second face 16 of the orbiting scroll 10. In fact, the mask 80 may be provided to only contact the circumferential surface 30, including only contacting the circumferential surface 30 along the segments thereof corresponding to the channel 32. The mask 80 may alternatively be provided to be devoid of engagement with the orbiting scroll 10 along the second face 16 thereof. The mask 80 may also be provided in the absence of any projecting or convex surfaces that are configured for reception within corresponding indented or concave surfaces formed along the second face 16 of the orbiting scroll 10, such as being provided in the absence of locating features for locating the mask 80 at a specific angular configuration relative to the orbiting scroll 10 to correspond to the positioning of the features 60, 90. The mask 80 may accordingly be formed to include an axially symmetric configuration such that any angular orientation of the mask 80 relative to the circumferential surface 30 may be selected when placing the first engaging segment 85 within the channel 32 without altering the described relationships. The inner surface 81 of the mask 80 may also be provided to include only the spaced segments 84 at positions disposed axially beyond the second face 16 of the orbiting scroll 10.

Figure 9:
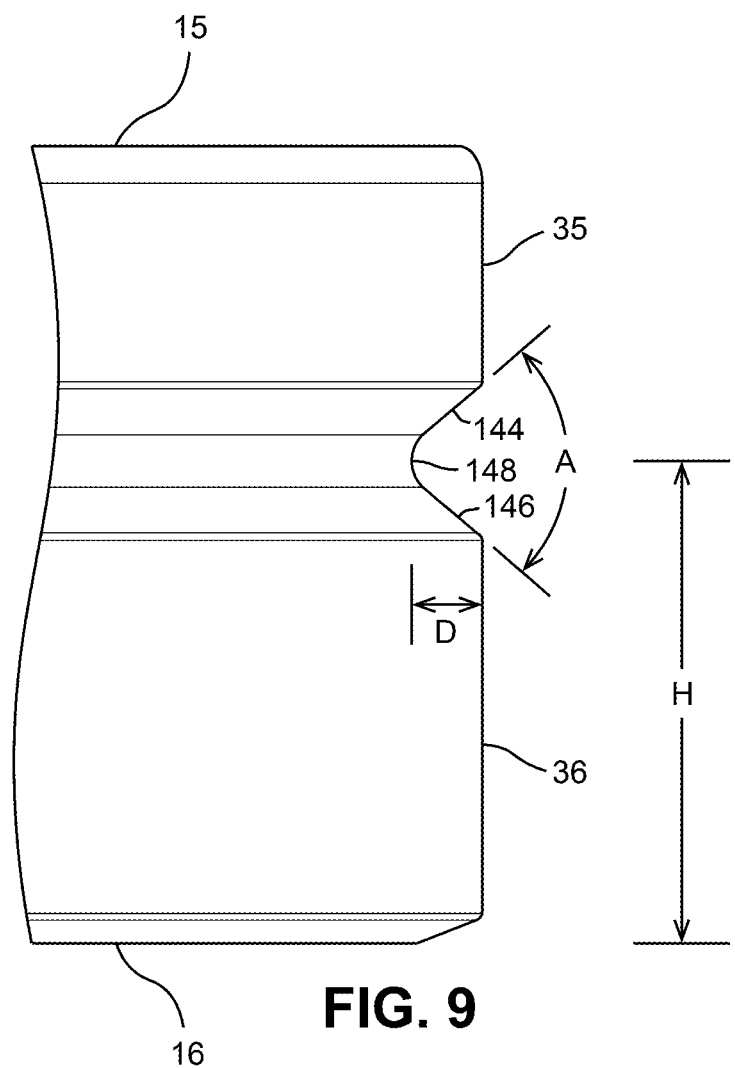
FIG. 9 is an enlarged fragmentary view of a circumferential surface of the orbiting scroll of FIG. 7 showing relative dimensions of a channel formed therein.

FIGS. 7-9 illustrate an orbiting scroll 110 according to another embodiment of the present invention. The orbiting scroll 110 is substantially similar to the orbiting scroll 10 of FIGS. 1-6 and includes the same reference numerals for referring to structural features common to each of the disclosed embodiments. The orbiting scroll 110 differs from the orbiting scroll 10 due to the formation of a modified channel 132 in the circumferential surface 30 of the platter 12 of the orbiting scroll 110, wherein the channel 132 of the orbiting scroll 110 includes a different size and shape in comparison to the channel 32 of the orbiting scroll 10.

The channel 132 is formed in the circumferential surface 30 at an axial position between the first axially extending segment 35 (first annular bead) and the second axially extending segment 36 (second annular bead) thereof. The channel 132 extends axially from a first axial end 133 intersecting the first axially extending segment 35 to a second axial end 134 intersecting the second axially extending segment 36. When progressing axially along the circumferential surface 30 from the first axial end 133 to the opposing second axial end 134 of the channel 132 the circumferential surface 30 includes a first convex surface 143, a first inclined surface 144, a concave surface 145, a second inclined surface 146, and a second convex surface 147.

The first convex surface 143 extends arcuately from a first end intersecting and arranged parallel to the first axially extending segment 35 to a second end arranged at an incline relative to the axial and radial directions of the orbiting scroll 110 with the second end intersecting and arranged parallel to the first inclined surface 144. The first convex surface 143 extends through an arc of about 50° of angular displacement to cause the first inclined surface 144 to be arranged at about a 40° angle relative to the axial and radial directions of the orbiting scroll 110. However, alternative angles of inclination may be selected for the first inclined surface 144, such as about a 45° angle of inclination, while remaining within the scope of the present invention. The first inclined surface 144 forms a frustoconical shape when extended circumferentially around the circumferential surface 30. The concave surface 145 extends arcuately from a first end intersecting and arranged parallel to the first inclined surface 144 to a second end intersecting and arranged parallel to the second inclined surface 146. In the present embodiment, the concave surface 145 extends arcuately through an arc of about 80° of angular displacement to cause the second inclined surface 146 to be arranged at about a 40° angle relative to the axial and radial directions of the orbiting scroll 110, but with an opposite inclination to that of the first inclined surface 144 relative to the radial direction. However, alternative angles of inclination may be selected for the second inclined surface 146, such as about a 45° angle of inclination, while remaining within the scope of the present invention. The second inclined surface 146 forms a frustoconical shape when extended circumferentially around the circumferential surface 30. As shown in FIG. 9, the total angle A present between the first inclined surface 144 and the opposing second inclined surface 146 may accordingly be about 80°, although alternative angles may be selected while remaining within the scope of the present invention, such as an angle A of 90°. The second convex surface 147 extends from a first end intersecting and arranged parallel to the second inclined surface 146 to a second end intersecting and arranged parallel to the second axially extending segment 36.

The channel 132 may be formed to include an axial center 148 of the concave surface 145 as the radially innermost surface thereof with the concave surface 45 centered axially along the channel 132. The concave surface 145 may be selected to include a radius of curvature that is greater than that of either of the convex surfaces 143, 147, such as selecting the concave surface 145 to include a radius of curvature that is about four times greater than that of either of the convex surfaces 143, 147. However, alternative combinations of arcuate shapes having different relative radii of curvatures may be utilized while remaining within the scope of the present invention.

As shown in FIG. 8, the orbiting scroll 110 may also include a convex surface 149 where the second axially extending segment 36 of the circumferential surface 30 first transitions radially inwardly at the second face 16 thereof. The convex surface 149 may include a radius of curvature substantially similar or equal to that of each of the convex surfaces 143, 147 of the channel 132. The convex surface 149 may be provided at the disclosed axial position to remove the formation of a sharp edge thereat.

With reference to FIG. 9, the orbiting scroll 110 may include the axial center 148 of the concave surface 145 disposed at an axial distance H from the second face 16 and at a depth D from the circumferential surface 30 along either of the axially extending segments 35, 36 disposed to either side of the channel 132. As one non-limiting example, the axial distance H may be about 6.7 mm and the depth D may be about 1.0 mm. When utilizing these dimensions for H and D, and when the angle A of inclination present between the inclined surfaces 144, 146 is the disclosed 80°, the radius of curvature of each of the described convex surfaces 143, 147, 149 may be about 0.1 mm while the radius of curvature of the concave surface 145 is about 0.4 mm. However, alternative combinations of relative dimensions may be utilized in forming the orbiting scroll 110 from those described without necessarily departing from the scope of the present invention.

The channel 132 accordingly forms a radially inwardly indented void in the platter wall 12 in a manner reducing the mass of the orbiting scroll 110 following the initial formation thereof. The channel 132 may be formed in the orbiting scroll 110 utilized any of the methods disclosed as suitable in forming the channel 32 in the orbiting scroll 10, as desired.

Figure 10:
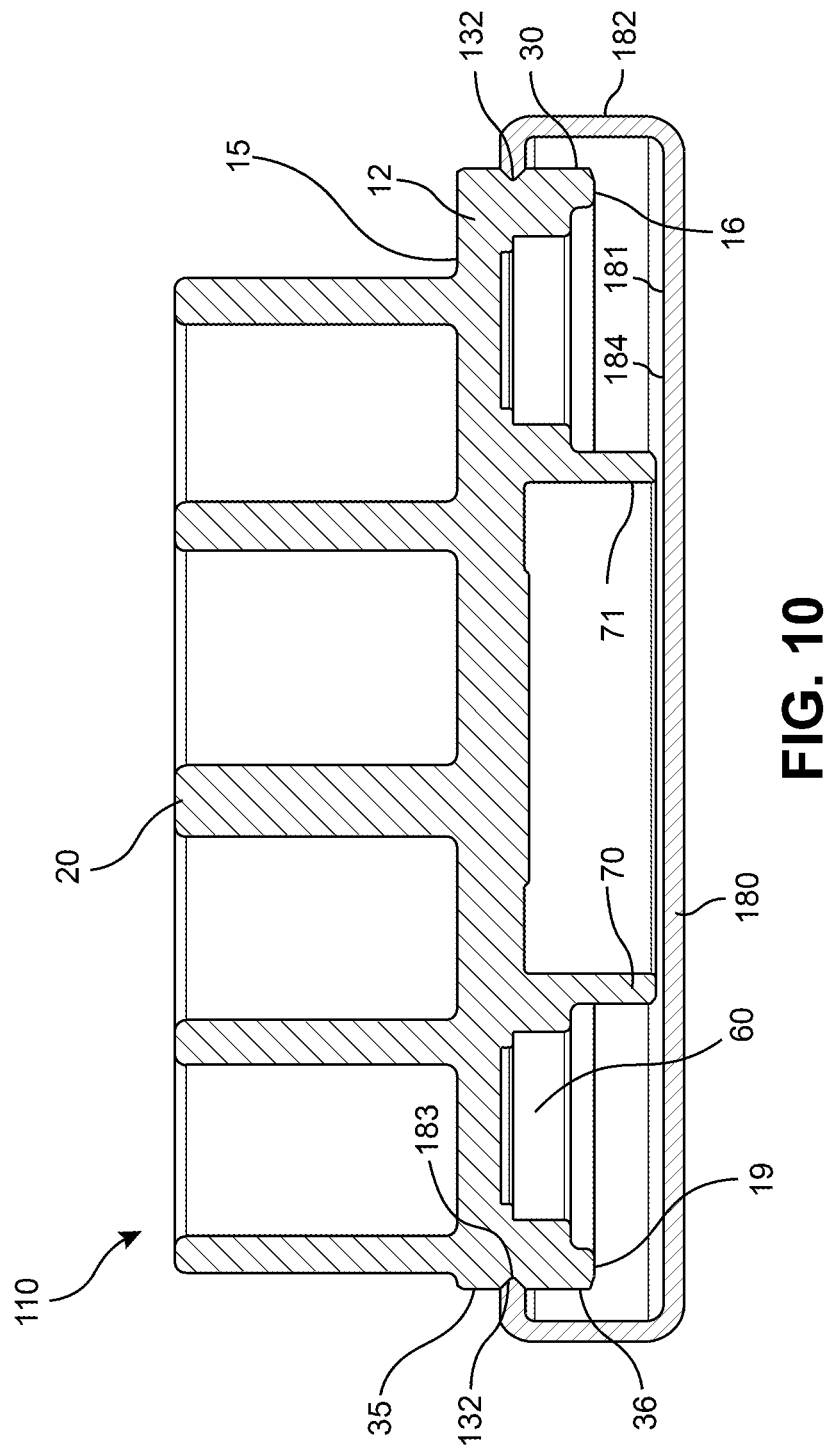
FIG. 10 an elevational cross-sectional view taken through a center plane of the orbiting scroll of FIG. 7 when a mask is applied thereto according to another method of the present invention.

As shown in FIG. 10, the orbiting scroll 110 having the channel 132 may be configured for use with a mask 180 during a coating process in the same manner as disclosed with regards to the orbiting scroll 10 and the mask 80. That is, the mask 180 may be provided to include an inner surface 181 and an outer surface 182, wherein the inner surface 181 of the mask 180 defines an opening configured to receive at least a portion of an axial length of the platter wall 12 therein during a masking process. The inner surface 181 is shown as including at least one engaging segment 183 wherein the inner surface 181 is configured to directly engage the circumferential surface 30 along the channel 132 formed therein and at least one spaced segment 184 where the inner surface 181 is spaced apart from the outer surface of the orbiting scroll 110 to form a void therebetween. The engaging segment 183 may include a cross-sectional shape corresponding to that of the engaging surfaces of the channel 132, wherein each convex surface of the channel 132 corresponds to a concave surface of the engaging segment 183, each concave surface of the channel 132 corresponds to a convex surface of the engaging segment 183, and each inclined surface of the channel 132 corresponds to a similarly inclined surface of the engaging segment 183. The engaging segment 183 may include a first surface extending at least partially in the radial direction and facing towards the first face 15 and a second surface extending at least partially in the radial direction and facing towards the second face 16.

The engaging segment 183 of the mask 180 may be disposed within the channel 132 via any of the methods described with regards to the mask 80 and the channel 32, such as elastically stretching the rim formed by the engaging segment 183 around the platter wall 12 for reception within the channel 132, or by directly molding the mask 180 onto the orbiting scroll 110 following the initial formation thereof with the engaging segment 183 molded within the channel 132. The mask 180 may include all of the same properties as described with reference to the mask 80, and may be utilized in an identical masking and coating process.

The shape of the channel 132 and the engaging segment 183 of the mask 180 provides for an advantageous configuration wherein the engaging segment 183 is axially restrained instantaneously with respect to each of the axial directions due to the manner in which only the radially innermost surface of the concave surface 145 is arranged in the axial direction, thereby causing all remaining radially extending surfaces of the channel 132 (corresponding to the described first and second surfaces of the engaging segment 183) to oppose axial movement of the engaging segment 183 in one of the respective axial directions thereof. The configuration of the channel 132 accordingly aids in further preventing removal of the mask 180 from the orbiting scroll 110 while also ensuring that a fluid-tight seal is formed where the engaging segment 183 directly engages the circumferential surface 30 along the channel 132.

Figure 11:
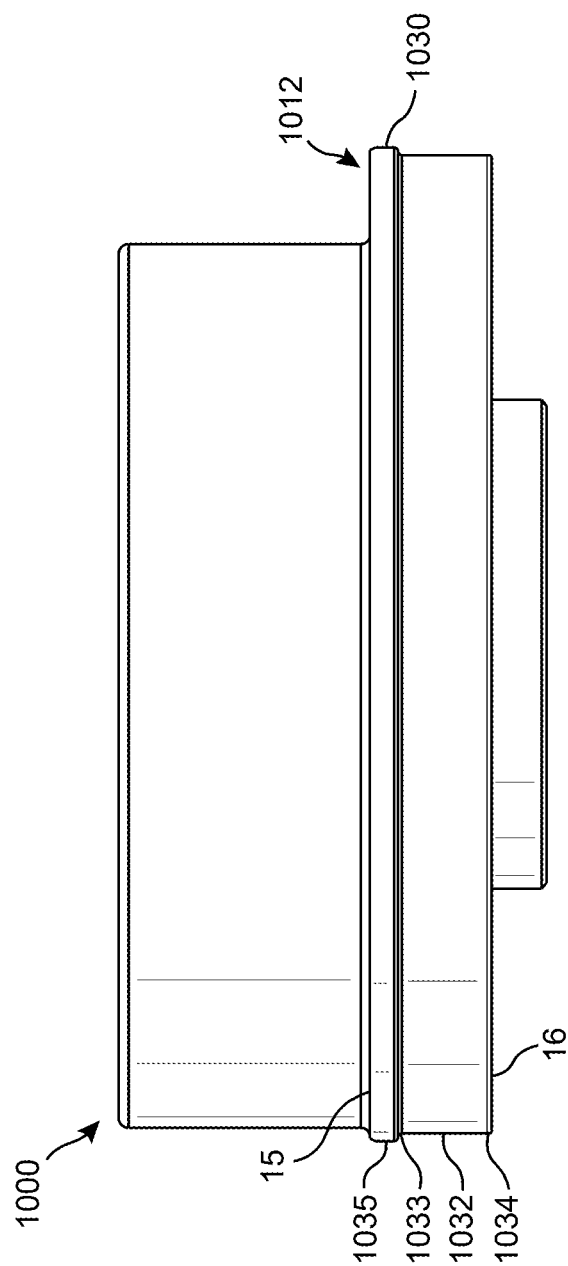
FIG. 11 is a side elevational view of an orbiting scroll having a mass reduction feature according to yet another embodiment of the present invention.

FIG. 11 illustrates an orbiting scroll 1000 according to another embodiment of the present invention. The orbiting scroll 1000 is identical to the orbiting scroll 10 except for a modification a circumferential surface 1030 of the platter wall 1012 thereof in comparison to the circumferential surface 30 of FIGS. 3-6, hence further description of the remaining features of the orbiting scroll 1000 are omitted herefrom, and identical features are identified with the same reference numerals hereinafter. The circumferential surface 1030 is formed to include a channel 1032 extending axially from a first axial end 1033 to a second axial end 1034 thereof. The first axial end 1033 is formed where the channel 1032 first extends radially inwardly away from a first axially extending segment 1035 of the circumferential surface 1030 forming a first annular bead 1035 having a greater radius (diameter) than the adjacent channel 1032. In contrast to the channel 32 of FIGS. 3-6, the second axial end 1034 of the channel 1032 is provided at the intersection of the circumferential surface 1030 with the second face 16 of the orbiting scroll 1000, thereby eliminating the presence of the second axially extending segment/second annular bead 36 from the embodiment of the platter wall 12 shown in FIGS. 3-6. The intersection of the portion of the circumferential surface 1030 defining the channel 1032 with the second face 16 may be radiused, chamfered, or beveled to eliminate a sharp edge or surface feature thereat. The transition from the first annular bead 1035 to the channel 1032 may include the same configuration as described with reference to the first transition segment 41. Although not pictured, it should be apparent that the orbiting scroll 10 may alternatively be modified to include the removal of the first annular bead 35 via a continued extension of the channel 32 towards the first face 15 thereof. Such a configuration includes an opposite configuration to that shown in FIG. 11 while removing additional circumferential material in the same manner.

The elimination of one of the annular beads 36 via the extension of the channel 1032 to the second face 16 of the orbiting scroll 1000 eliminates additional material therefrom for further reducing the power needed to orbit the orbiting scroll 1000. The continued removal of the material to the axial end of the circumferential surface 1030 also provides a simple tool path during the corresponding machining process, as one less radiused surface is produced.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An orbiting scroll of a scroll compressor comprising:
a longitudinal axis; and
a platter wall having a first face including a spiral structure projecting therefrom disposed along the axis, the platter wall having a second face disposed along the axis including a coupling structure configured to couple the orbiting scroll to a drive mechanism of the scroll compressor and a circumferential surface connecting the first face to the second face in the axial direction of the platter wall about a periphery of each of the first face and the second face, the orbiting scroll including a first mass reduction feature provided as an inwardly indented channel formed in the circumferential surface, the channel being disposed along the circumferential surface respectively spaced apart from both the first face and the second face, wherein the channel forms a retaining feature configured to retain a rim of a mask therein, the mask configured to mask at least a portion of the circumferential surface of the platter wall when the rim thereof is retained within the channel.

2. The orbiting scroll of claim 1, wherein the channel defines an undercut in the circumferential surface relative to at least one of the periphery of the first face or the periphery of the second face.

3. The orbiting scroll of claim 1, wherein the channel defines an annular void in the platter wall.

4. The orbiting scroll of claim 3, wherein the annular void is axially aligned with at least a portion of at least one of the first face or the second face.

5. The orbiting scroll of claim 3, wherein at least a portion of the platter wall is disposed directly between the annular void and one of the first face or the second face with respect to the axial direction of the platter wall.

6. The orbiting scroll of claim 1, wherein the orbiting scroll includes a second mass reduction feature provided as at least one indentation formed in the second face, wherein the second mass reduction feature does not engage another component of the scroll compressor during an orbiting of the orbiting scroll therein.

7. The orbiting scroll of claim 1, wherein the channel extends in at least the axial direction within the platter wall and an axial cross section of the channel includes an axial cross section shape of the channel having rectangular shape that is further defined by concave portions.

8. The orbiting scroll of claim 1, wherein the circumferential surface includes a first axially extending surface extending from the first face to a first axial end of the channel, and wherein the circumferential surface is indented radially inwardly along the channel relative to the first axially extending surface.

9. The orbiting scroll of claim 8, wherein the circumferential surface further includes a second axially extending surface extending from the second face to a second axial end of the channel, wherein the circumferential surface is indented radially inwardly along the channel relative to a the second axially extending surface of the circumferential surface.

10. The orbiting scroll of claim 8, wherein the circumferential surface is devoid of an edge where the circumferential surface transitions from the first axially extending surface to the convex arcuate surface at the first axial end of the channel.

11. The orbiting scroll of claim 8, wherein the circumferential surface includes a convex arcuate surface formed along the channel at the first axial end thereof, and wherein the first axially extending surface extends tangentially from the convex arcuate surface at the first axial end of the channel.

12. The orbiting scroll of claim 11, wherein the circumferential surface includes a concave arcuate surface formed along the channel at a position disposed radially inwardly of the convex arcuate surface.

13. The orbiting scroll of claim 12, wherein the circumferential surface includes an axially extending segment formed along the channel, and wherein the axially extending segment extends tangentially from the concave arcuate surface.

14. A method of manufacturing an orbiting scroll of a scroll compressor, the method comprising the steps of:
- forming a platter wall having a first face including a spiral structure projecting therefrom disposed along a longitudinal axis, the platter wall including a second face disposed along the axis having a coupling structure configured to couple the orbiting scroll to a drive mechanism of the scroll compressor, and a circumferential surface connecting the first face to the second face in the axial direction of the platter wall about a periphery of each of the first face and the second face;
- removing material from the platter wall along the circumferential surface thereof following the forming of the platter wall to reduce a mass thereof, the removing of the material from the circumferential surface forming an inwardly indented channel therein, the channel being disposed along the circumferential surface respectively spaced apart from both the first face and the second face; and
- disposing a mask over a portion of the platter wall, the step of disposing the mask over the portion of the platter wall including a circumferentially extending rim of the mask retained within the channel of the circumferential surface of the platter wall.

15. The method of claim 14, wherein the circumferential surface has a cylindrical shape following the step of forming the platter wall, and wherein the circumferential surface is formed to be radially inwardly indented along the channel relative to the cylindrical shape following the step of forming the platter wall.

16. The method of claim 14, further comprising a step of removing material from the platter wall along the second face thereof following the step of forming of the platter wall to further reduce the mass thereof, the removing of the material from the second face forming an inwardly indented surface of the second face that is configured to not engage another component of the scroll compressor during an orbiting of the orbiting scroll therein.

17. The method of claim 14, further comprising a step of coating the spiral structure projecting from the first face of the platter wall with a surface coating following the step of forming the platter wall and the step of disposing the mask over the portion of the platter wall.

18. The method of claim 14, wherein the rim of the mask is retained within the channel by one of elastically receiving the mask over the second face of the platter wall or molding the rim of the mask directly into the channel.

19. An orbiting scroll of a scroll compressor comprising:
- a platter wall having a first face including a spiral structure projecting therefrom, a second face having a coupling structure configured to couple the orbiting scroll to a drive mechanism of the scroll compressor, and a circumferential surface connecting the first face to the second face in an axial direction of the platter wall about a periphery of each of the first face and the second face, the orbiting scroll including a first mass reduction feature provided as a channel formed in the circumferential surface, wherein the circumferential surface includes a first axially extending surface extending from the first face to a first axial end of the channel, wherein the circumferential surface is indented radially inwardly along the channel relative to the first axially extending surface, wherein the channel is formed by a first inclined surface inclined relative to the first axially extending surface, a second inclined surface inclined relative to the first axially extending surface, and a concave surface at an intersection of the first inclined surface and the second inclined surface, and wherein the concave surface has an arcuate shape.

20. The orbiting scroll of claim 19, wherein the first inclined surface forms a frustoconical shape when extended circumferentially around the circumferential surface.

21. The orbiting scroll of claim 19, wherein the second inclined surface forms a frustoconical shape when extended circumferentially around the circumferential surface.

22. The orbiting scroll of claim 19, wherein the circumferential surface includes a convex arcuate surface formed along the channel at the first axial end thereof, and wherein the first axially extending surface extends tangentially from the convex arcuate surface at the first axial end of the channel.

* * * * *